(12) United States Patent
Jimenez Pino et al.

(10) Patent No.: US 12,149,180 B2
(45) Date of Patent: Nov. 19, 2024

(54) DC-DC MIDDLE-POINT TOPOLOGY INTERLEAVING CONTROL

(71) Applicant: LEAR CORPORATION, Southfield, MI (US)

(72) Inventors: Rafael Jimenez Pino, Valls (ES); Pablo Gaona Rosanes, Valls (ES); Hector Sarnago Andia, Ólvega (ES); Oscar Lucia Gil, Saragossa (ES)

(73) Assignee: Lear Corporation, Southfield, MI (US)

( * ) Notice: Subject to any disclaimer, the term of this patent is extended or adjusted under 35 U.S.C. 154(b) by 463 days.

(21) Appl. No.: 17/517,835

(22) Filed: Nov. 3, 2021

(65) Prior Publication Data

US 2022/0200465 A1 Jun. 23, 2022

Related U.S. Application Data

(60) Provisional application No. 63/126,601, filed on Dec. 17, 2020.

(51) Int. Cl.
*H02M 3/335* (2006.01)
*B60L 53/20* (2019.01)

(52) U.S. Cl.
CPC ......... *H02M 3/33584* (2013.01); *B60L 53/20* (2019.02); *H02M 3/33573* (2021.05); *H02M 3/33576* (2013.01); *H02M 3/33592* (2013.01); *B60L 2210/10* (2013.01)

(58) Field of Classification Search
CPC ......... H02M 3/33584; H02M 3/33573; H02M 3/33576; H02M 3/33592; H02M 1/325; H02M 1/0043; H02M 3/1586; H02M 3/285; H02M 3/33561; B60L 53/20; B60L 2210/10; Y02T 10/70; Y02T 10/7072; Y02T 90/14

See application file for complete search history.

(56) References Cited

U.S. PATENT DOCUMENTS 5,757,633 A * 5/1998 Bowles ................... H02M 7/49
363/71
10,804,809 B1 * 10/2020 Yelaverthi ............... H02J 1/102
(Continued)

FOREIGN PATENT DOCUMENTS

| DE | 11-2015-004164 T5 | 6/2017 |
|---|---|---|
| JP | 2017-060285 A | 3/2017 |
| WO | 2019/158567 A1 | 8/2019 |

OTHER PUBLICATIONS

Office Action dtd Sep. 1, 2023 for German Appn. No. 10-2021-132028.3, English translation, 5 pgs.

*Primary Examiner* — Yusef A Ahmed
(74) *Attorney, Agent, or Firm* — Brooks Kushman P.C.

(57) ABSTRACT

A DC-DC converter that converts an input DC voltage to an output DC voltage includes a first switching network, a first transformer component, a second transformer, a first secondary side rectifier circuit, and a second secondary side rectifier circuit. The first secondary side rectifier circuit receives the first secondary side AC voltage and outputs a first temporal portion of the output DC voltage during a first portion of a duty cycle. The second secondary side rectifier circuit receives the second secondary side AC voltage and outputs a second temporal portion of the output DC voltage during a second portion of the duty cycle.

17 Claims, 5 Drawing Sheets

(56) References Cited

U.S. PATENT DOCUMENTS

| | | | |
|---|---|---|---|
| 2010/0026095 A1* | 2/2010 | Phadke | H02M 3/285 307/31 |
| 2011/0101951 A1* | 5/2011 | Zhang | H02M 3/33592 323/305 |
| 2012/0092898 A1* | 4/2012 | Raju | H02M 1/4258 363/17 |
| 2012/0275197 A1* | 11/2012 | Yan | H02M 3/33592 363/21.02 |
| 2013/0234669 A1* | 9/2013 | Huang | H02J 7/00302 320/126 |
| 2013/0314948 A1* | 11/2013 | Perreault | H02M 7/497 363/8 |
| 2013/0343089 A1* | 12/2013 | Gupta | H02M 7/49 363/16 |
| 2014/0253017 A1* | 9/2014 | Kominami | H02J 7/02 320/103 |
| 2016/0149501 A1* | 5/2016 | Dai | H02M 3/07 363/21.02 |
| 2016/0152147 A1 | 6/2016 | Sasaki | |
| 2016/0190943 A1* | 6/2016 | Chen | H02M 3/33569 363/21.06 |
| 2017/0005584 A1* | 1/2017 | Guepratte | H02M 3/33561 |
| 2017/0104422 A1* | 4/2017 | Okumura | H02M 7/4807 |
| 2018/0097361 A1* | 4/2018 | Jakka | H02J 3/02 |
| 2018/0138801 A1* | 5/2018 | Chen | H01F 27/2804 |
| 2018/0175744 A1* | 6/2018 | Jasim | H02M 1/14 |
| 2018/0175761 A1* | 6/2018 | Jha | H02P 9/007 |
| 2018/0198393 A1* | 7/2018 | Wagoner | H02P 27/08 |
| 2018/0226182 A1* | 8/2018 | Fe | H01F 27/245 |
| 2019/0058409 A1* | 2/2019 | Ishibashi | H02J 3/36 |
| 2019/0238059 A1* | 8/2019 | Dai | H02M 3/33576 |
| 2019/0326826 A1* | 10/2019 | Otake | H02M 3/33573 |
| 2019/0355506 A1* | 11/2019 | Fei | H01F 27/2804 |
| 2020/0006970 A1* | 1/2020 | Chen | H02M 7/217 |
| 2020/0373785 A1* | 11/2020 | Bagchi | B63G 8/00 |
| 2020/0373847 A1* | 11/2020 | Saha | H02M 3/33576 |
| 2020/0395839 A1* | 12/2020 | Ayyanar | H02M 1/4208 |
| 2021/0036623 A1* | 2/2021 | Bemat | G06F 1/26 |
| 2021/0143665 A1* | 5/2021 | Jimenez Pino | H02M 7/06 |
| 2021/0155100 A1* | 5/2021 | Khaligh | B60L 55/00 |
| 2021/0234473 A1* | 7/2021 | Alnajjar | H02M 7/4807 |
| 2022/0045618 A1* | 2/2022 | Kumar | H02M 7/06 |
| 2022/0069719 A1* | 3/2022 | Cao | H02M 1/007 |
| 2022/0224236 A1* | 7/2022 | Elshaer | H01F 27/40 |
| 2022/0255417 A1* | 8/2022 | Zhu | H02M 3/285 |
| 2022/0286055 A1* | 9/2022 | Baranwal | H02J 7/06 |
| 2023/0163675 A1* | 5/2023 | Zhang | H02J 3/381 307/82 |

* cited by examiner

DC-DC MIDDLE-POINT TOPOLOGY INTERLEAVING CONTROL

CROSS-REFERENCE TO RELATED APPLICATIONS

This application claims the benefit of U.S. provisional application Ser. No. 63/126,601 filed Dec. 17, 2020, the disclosure of which is hereby incorporated in its entirety by reference herein.

TECHNICAL FIELD

In at least one aspect, a method and device for DC to DC conversion in an electric or hybrid electric vehicle is provided.

SUMMARY

In at least one aspect, a DC-DC converter that converts an input DC voltage to an output DC voltage is provided. The DC-DC converter includes a primary side switching network, a first transformer component, a second transformer, a first secondary side switching network, and a second secondary side switching network. The primary side switching network receives the input DC voltage and outputs a primary side AC voltage. The first transformer component includes a first plurality of primary windings and a first plurality of secondary windings. The first transformer component receives the primary side AC voltage and outputs a first secondary side AC voltage. The second transformer component includes a second plurality of primary windings and a second plurality of secondary windings. The first plurality of primary windings is in series with the second plurality of primary windings. The second transformer component receives the primary side AC voltage and outputs a second secondary side AC voltage. The first secondary side switching network receives the first secondary side AC voltage while the second secondary side switching network receives the second secondary side AC voltage. Characteristically, outputs from the first plurality of secondary windings and the second plurality of secondary windings are combined to form the output DC voltage.

In another aspect, there is a first phase difference between the first plurality of secondary windings and the first plurality of primary windings and a second phase difference between the second plurality of secondary windings and the second plurality of primary windings in the DC-DC converter.

Advantageously, the DC-DC converter improves performance while providing high flexibility. The design also provides cost reduction and time to market. The DC-DC converter is particularly suitable for fault-tolerant applications.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
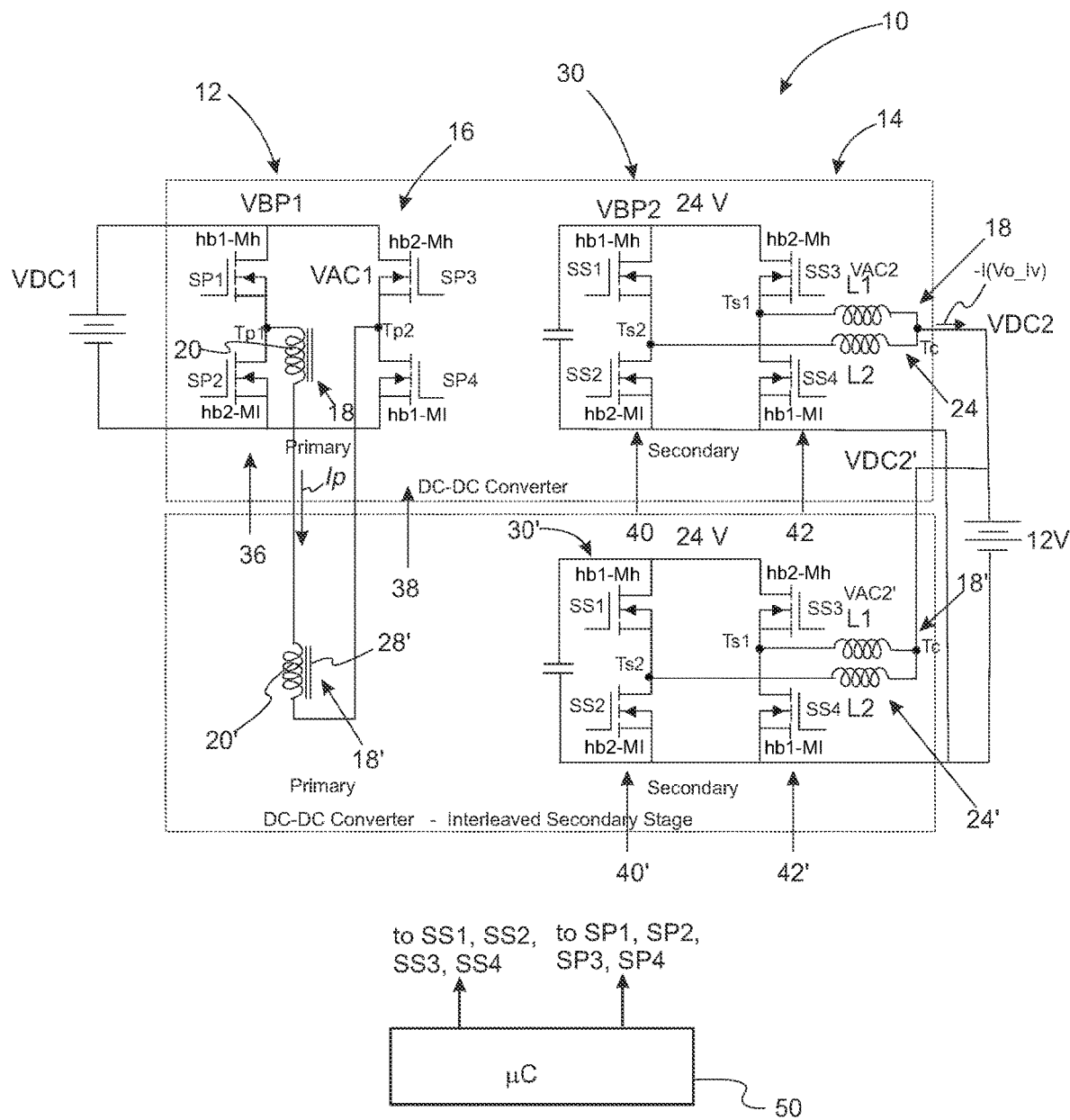
FIG. 1A. Schematic diagram of DC-DC converter having two transformers in which the primary windings are configured in a series configuration.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "electrical signal" refers to the electrical output from an electronic device or the electrical input to an electronic device. The electrical signal is characterized by voltage and/or current. The electrical signal can be a stationary signal or it can vary with respect to time.

The terms "DC signal" or "DC voltage" refer to electrical signals or electrical voltage that have voltage value that are always over 0 volts.

The terms "AC signal" or "AC voltage" refer to electrical signals or electrical voltage that have voltages varying between positive and negative voltages and crossing 0 volts The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

Abbreviations:
 "AC" means alternating current.
 "DAB" means a dual active bridge.
 "DC" means direct current.
 "DCDC" means direct current to direct current.
 "HV/LV" means high voltage to low voltage.

In general, a DC/DC converter system that includes two (or more) secondary side switching networks is provided. Each switching network typically includes an input/output voltage ratio with independent control that can force phase shifting between the H-Bridges on the primary side and the secondary side.

Figure 1B:
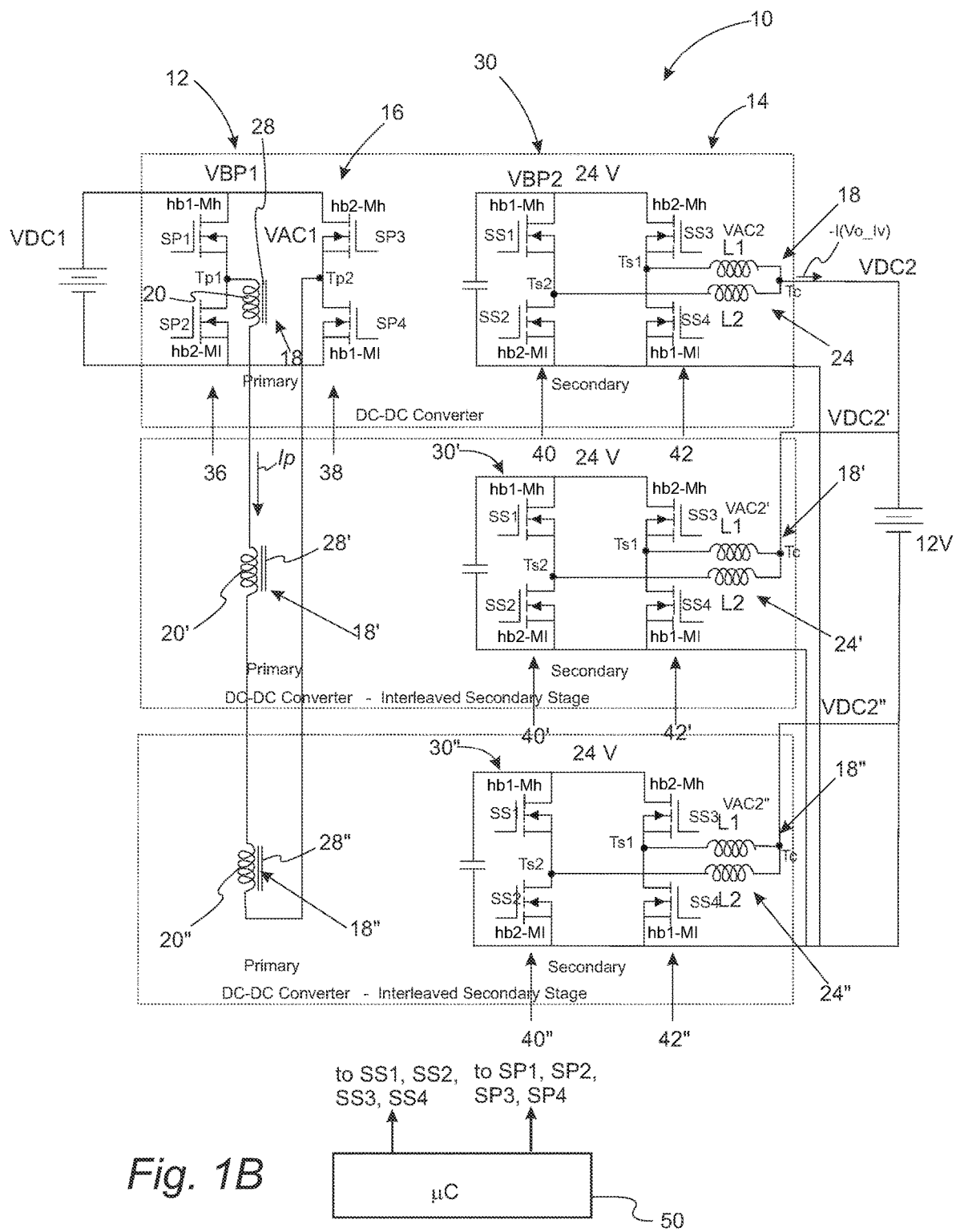
FIG. 1B. Schematic diagram of DC-DC converter having three transformers in which the primary windings are configured in a series configuration.
Figure 1C:
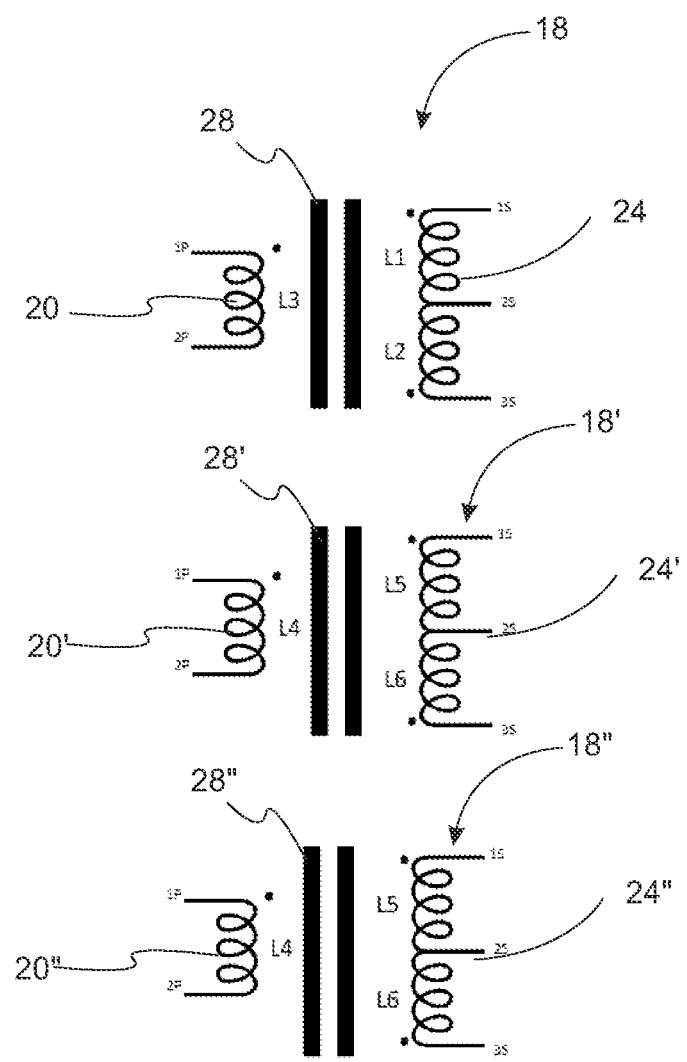
FIG. 1C. Schematic diagram of a transformer used in the system of FIGS. 1A and 1B.

Referring now to FIGS. 1A, 1B, and 1C, schematics of a direct current/direct current (DC/DC) converter and transformer included therein are provided. In a variation, DC/DC converter system 10 includes a primary stage 12 and a secondary stage 14. In this context, primary stage 12 and secondary stage 14 can also be referred to as primary side 12 and a secondary side 14. The primary stage 12 is configured to receive a DC voltage VDC1 as input, while the secondary stage is configured to output a DC voltage VDC2. Typically, the DC voltage VDC2 is less than the DC voltage VDC1. In a refinement, input DC VDC1 voltage is in a range from 230 to 650 volts while the output voltage VDC2 is from about 10 to 18 volts. Typically, the DC VDC1 voltage is about 400 volts, while voltage VDC2 is about 12 volts. In a refinement, DC/DC converter system 10 is bidirectional. Therefore, the converter system can work with the roles of VDC2 and VDC1 reversed, i.e., DC voltage VDC2 can be the input, and DC voltage VDC1 can be the output.

DC/DC converter system 10 also includes transformers components 18 and 18' (and optionally 18"). First transformer component 18 includes a plurality of primary windings 20 and a plurality of secondary windings 24. Second transformer component 18' includes a plurality of primary windings 20' and a plurality of secondary windings 24'. Similarly, any additional transformer components such as the third transformer component 18" also include a plurality of primary windings 20" and a plurality of secondary windings 24".

Primary side AC voltage VAC1 is received across primary windings 20, 20' and 20", with each of transformer components 18, 18', and any additional transformer components 18" outputting secondary side AC voltages VAC2, VAC2', and VAC2", respectively. Therefore, AC voltage VAC1 is shared across (divided across) primary windings 20, 20' and 20". In one example, the division is equal (i.e., ½ for two primary windings and ⅓ for 3 primary windings). In some specific cases (where the secondary condition is transferred to the respective primary) this sharing may be different. FIG. 1B depicts a variation in which the transformer further includes one or more additional pluralities of primary windings 20" that are in series with the first plurality of primary windings 20 and the second plurality of primary windings 20'.

In a variation, a first phase difference between first plurality of secondary windings 24 and the first plurality of primary windings 20 and a second phase difference between the second plurality of secondary windings 24' and the second plurality of primary windings 20' are adjusted (e.g., optimized) to improve conversion efficiency. In a refinement, the first phase difference and second phase difference are adapted according to an input to output voltage ratio such that the conversion efficiency is improved compared to a case in which the first phase difference and second phase difference are zero. Therefore, the first phase difference and second phase difference can be from 0 degrees to 180 degrees.

In another variation, when DC-DC converter 10 includes a third transformer component 18" which includes third plurality of primary windings 20" and a third plurality of secondary windings 24", the third transformer component 18" receives a third portion of the primary side AC voltage and outputting a third secondary side AC voltage. Characteristically, the third plurality of primary windings 20" is in series with the first plurality of primary windings 20 and the second plurality of primary windings 20'. Moreover, the outputs from the first plurality of secondary windings 20, the second plurality of secondary windings 20', and the third plurality of secondary windings 20" are combined to form the output DC voltage VDC2. In a refinement, the second plurality of secondary windings 24' and the third plurality of secondary 24" are set at the same phase difference with respect to the first plurality of primary windings 20 and the second plurality of primary windings 20'. In another refinement, when the input/output voltage ratio below a predetermined threshold, counter-phases in two of the secondaries are fixed to produce a functional cancelation. The predetermined threshold is a value that separates high input/output voltage ratios from low input/output voltage ratios. For example, the threshold can be about 35.

Characteristically, as depicted in FIGS. 1A, 1B, and 1C, primary windings 20 and 20' (and any additional primary windings 20") are arranged in series. Transformers 18, 18', and 18" each also include cores 28, 28', and 28", respectively, each of which is typically a magnetic core. Each core 28, 28', and 28" can provide electrical separation of the primary stage 12 from the secondary stage 14.

In a variation, the primary windings 20, 20' (and 20" if present) are part of the primary stage while the secondary windings 24, 24' (and 24" if present) are part of the secondary stage. The primary windings 20, 20' (and 20" if present) are in electrical communication with the primary side switching network 16 while the secondary windings 24 and 24' (and 24" if present) are in electrical communication with secondary side switching stages 30 and 30' (and 30" if present) respectively.

Characteristically, DC secondary side switching stages 30, 30', and 30" accomplish the conversion to the output voltage. The secondary side switching networks 30, 30', and any additional switching networks 30" receives the secondary AC voltages VAC2, VAC2', and VAC2" while the output DC voltages VDC2, VDC2', and VDC2 are outputted from the secondary transformer windings. In another refinement, secondary transformer windings can cause a short-circuiting effect in the respective primary coil. In this case, the other primary windings (i.e., the primary windings not associated with the shorted secondaries) will see the increased AC voltage with their respective secondaries also receiving a higher AC voltage as well.

Still referring to FIGS. 1A and 1B, the primary side switching network 16 can include a primary side H-bridge circuit. Therefore, the primary side switching network 16 includes switches SP1, SP2, SP3, and SP4. Primary side switching network 16 includes a first H-bridge arm 36 and a second H-bridge arm 38. In the first H-bridge arm 36, the source of transistor switch SP1 is connected to a first input terminal Tp1 of primary windings 20 of transformer 18. The drain of transistor switch SP1 is connected to the positive side of the primary side voltage bus VPB1, which is in electrical communication with the positive side of DC input voltage VDC1. The source of transistor switch SP1 is also connected to the drain of transistor switch SP2. Therefore, both the source of transistor switch SP1 and the drain of transistor switch SP2 are connected to the first input terminal Tp1 of the in series combination of primary windings 20, 20', 20". The source of transistor switch SP2 is in electrical communication with the negative side of primary side voltage bus VPB1 and, therefore, the negative side of DC input voltage DCV1. Similarly, in the second H-bridge arm 38, the source of transistor switch SP3 is connected to a second input terminal Tp2 of the in series combination of primary windings 20, 20', 20". The drain of transistor switch SP3 is connected to the positive side of input voltage VDC1. The source of transistor switch SP3 is also connected to the drain of transistor switch SP4. Therefore, the source of transistor switch SP3 and the drain of transistor switch SP4 are connected to the second input terminal Tp2 of the in series combination of primary windings 20, 20', 20". The source of transistor switch SP4 is in electrical communication with the negative side of input voltage VDC1. During operation, when the primary stage receives the DC input VDC1, the first switching network 16 allows or establishes the first AC voltage VAC1 that is applied to transformer 18 by creating positive and negative voltages that are alternatively applied to the transformer.

The present embodiment is not limited by the specific topology for the secondary stage. Typically, second switching networks 30, 30' (and any additional switching networks 30") are configured to convert the secondary stage AC voltages VAC2, VAC2' (and VAC2" if necessary) to output DC voltage VDC2. FIG. 1A provides a specific example of such a topology that includes a second switching network 46 that is disclosed in U.S. Provisional Pat. No. 63/067,206 filed August 18, 2020. Typically, each second side switching networks 30 and 30' can each include an H-bridge circuit. Therefore, first secondary side switching network 30 includes first secondary side H-bridge arm 40 and second secondary side H-bridge arm 42. Similarly, the second secondary side switching network 30' includes first secondary side H-bridge arm 40' and second secondary side H-bridge arm 42'. First H-bridge arm 40 includes first transistor switch SS1 and second transistor switch SS2 while second H-bridge arm 42 includes a third transistor switch SS3 and a fourth transistor switch SS4. Similarly, first H-bridge arm 40' includes first transistor switch SS1' and second transistor switch SS2' while second H-bridge arm 42' includes a third transistor switch SS3' and a fourth transistor switch SS4'.

The present embodiments are characterized in that each switching networks 30, 30' (and any additional switching networks) are independently controlled. In a refinement, when there are 2 switching networks 30, 30', the converter can be controlled such that that there may be a different phase shift between them (from 0 or in-phase to 180° or in-counter-phase).

In the specific example depicted in FIG. 1A, the plurality of secondary windings 24 includes first set of secondary windings L1 and the second set of secondary windings L2. Similarly, plurality of windings 24' includes first set of secondary windings L1 and second set of secondary windings L2. The first switching network 16 and the second switching networks 30, 30', and if present 30" are operated such that a first current I(L1) flows through first set of secondary windings L1 from contact Ts1 to contact TC, a second current I(L2) flows through first set of secondary windings L2 from contact Ts2 to contact TC, and a third current Ip flows through the primary windings 20, 20', and if present 20". Characteristically, the first current, the second current, third current are at least partially established by mutual inductance between the primary windings and the secondary windings.

In a variation, converter 10 further includes a microcontroller 50 configured to control the transistor switches in the primary side switching network 16 and the second side switching networks 30, 30'. In a refinement, microcontroller 50 can send control signals to the gates of transistor switches SP1, SP2, SP3, and SP4. In this regard, transistor switches SP1 and SP4 form a first primary side H-bridge and are simultaneously turned on and off by the control signal.

Similarly, transistor switches SP2 and SP3 form a second primary side H-bridge on the primary side and are simultaneously turned on and off by the control signals. The first primary side H-bridge 16 and the second primary side H-bridges 30, 30' are alternatingly actuated by the control signals. Therefore, the control signal for the first primary side H-bridge is out of phase (typically)180° with the second primary side H-bridge. This results in the voltage output of the first primary side H-bridge being out of phase with the output voltage of the second primary side H-bridge.

Microcontroller 50 can also send control signals to the gates of transistor switches SS1, SS2, SS3, SS4, SS1', SS2', SS3', SS4', SS1", SS2", SS3", and SS4". In this regard, transistor switches SS1 and SS4 (or SS1' and SS4' or SS1" and SS4") form a first primary side H-bridge and are simultaneously turned on and off by the control signal. Similarly, transistor switches SS2 and SS3 (or SS2' and SS3' or SS2" and SS3") form a second primary side H-bridge on the secondary side and are simultaneously turned on and off by the control signals. The first secondary side H-bridge and the second secondary side H-bridge are alternately actuated by the control signals. Therefore, the control signal for the first secondary side H-bridge is out of phase (typically) 180° with the second secondary side H-bridge. This results in the voltage output of the first secondary side H-bridge being out of phase with the output voltage of the second secondary side H-bridge. Although the present invention is not limited by the type and frequency of the control signal, frequencies of about 20 to 120 kHZ can be used. The control signals can be square waves or any other suitable waveform.

In the DC/DC converter system configuration set forth above, performance of the converter can be improved by adapting the modulation of each secondary switching cell, or deactivating them, according to the operating voltage range such that when primary and secondary voltages are in upper or lower voltage values so that the converter is out of the nominal design desired conditions. This allows adapting the primary voltage to the operating conditions for efficient operation (the converter operates essentially as a multi-level converter, where the output voltage, i.e. primary voltage in this invention, is controlled by the number of active levels, i.e. secondary switching cells in this invention, and their modulation.).

Figure 2A:
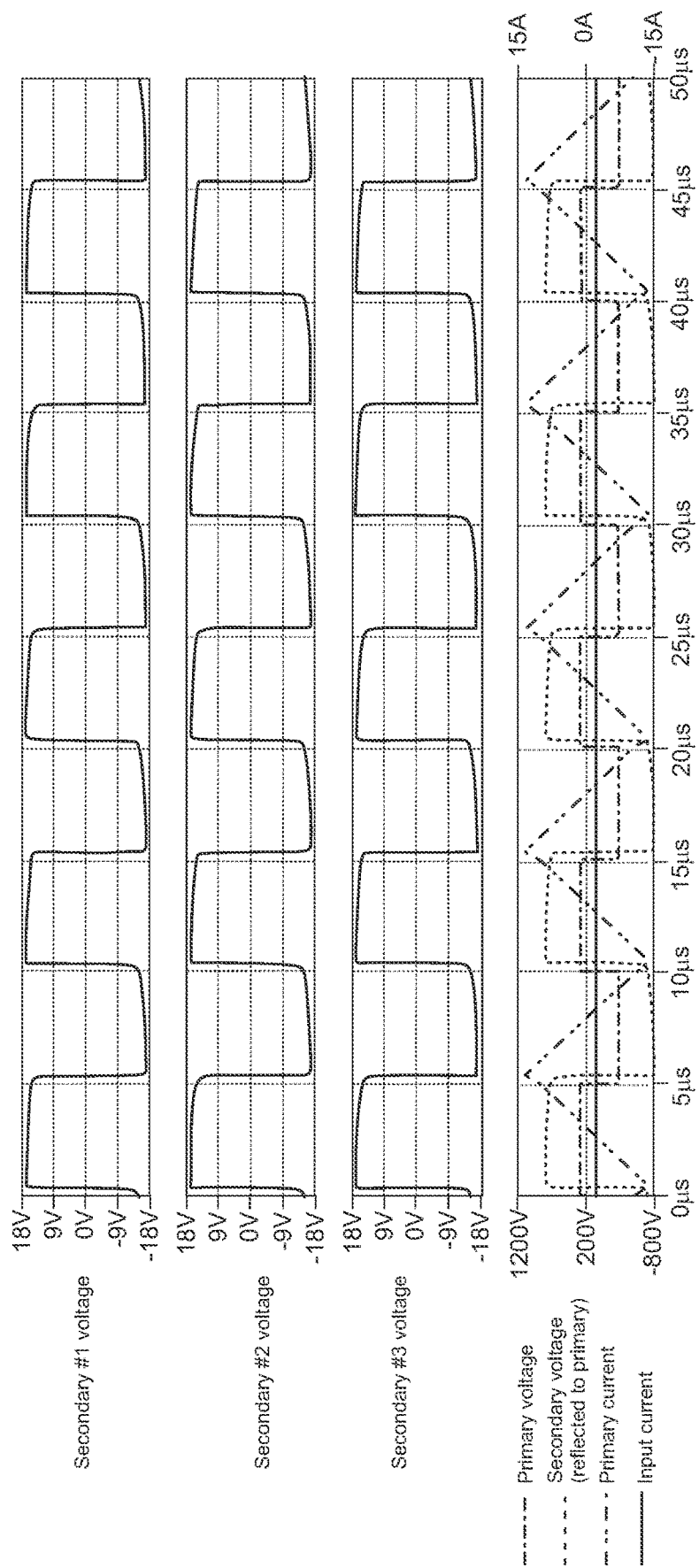
FIG. 2A. Output current of one full-bridge stage and contribution of each one of the three secondary coils during the standard operation.
Figure 2B:
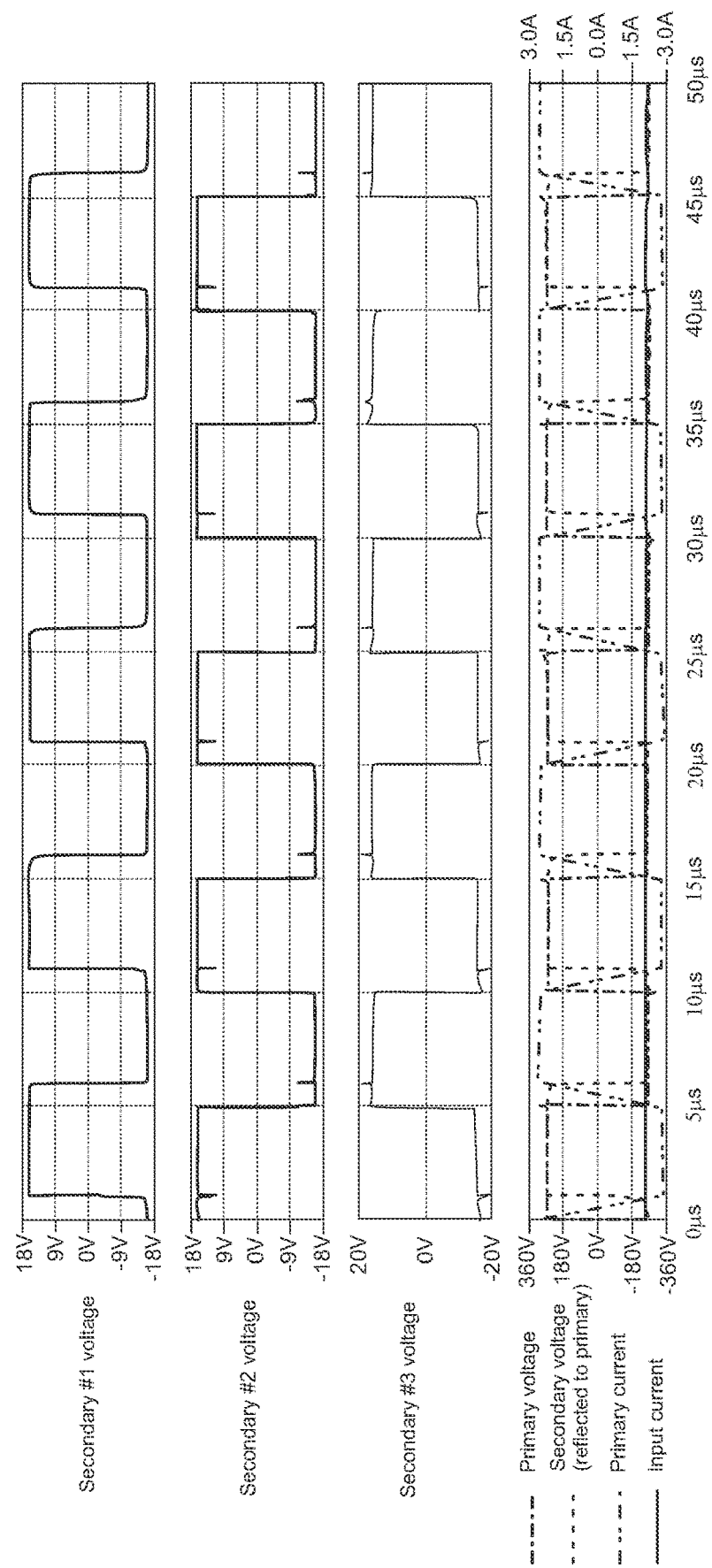
FIG. 2B. Output current of one full-bridge stage and contribution of each one of the three secondary coils during a novel phase-shift operation.

FIGS. 2A and 2B provide the output current of one full-bridge stage and contribution of each one of the three secondary coils. FIG. 2A illustrates the standard operation in which the secondary windings operate in phase. This operation is challenging for extreme voltages, as the one shown in the simulation (250 V low limit), because the difference between primary and secondary voltage increases primary current. As depicted in FIG. 2B, the proposed topology enables using phase-shift in secondary windings to cancel voltage, so the voltage reflected in primary winding is closer to the voltage in the primary bus, decreasing the primary current for the same processed power. In the example, a reduction factor of 1.7 in primary current is achieved for the same processed power. In should be appreciated that this scheme can be used for any combination of input/output voltages.

The following formula 1 provides a control approach by setting the DC high voltage current:

$$I_{dc}(HV) = 2FI(1-2FI)\left(\frac{V_{lv}}{nf_{sw}L}\right) \quad (1)$$

wherein:

$I_{dc}$(HV): DC high voltage current target. Idc(HV) is calculated from the power demand at secondary (V1v*Ilv) and input Vhv voltage (VDC1) where Vlv is low voltage (VDC2) and Ilv is the current at the output IDC2;

$FI_n$: shifting primary to one of the respective active secondaries (range 0 to 0.25 for active secondaries (design constraint)). FI is the shifting of the switching sequence for the secondary full bridges with respect to the primary full bridge switching sequence. FI is calculated from previous formula 1 when Idc(HV), Vlv, fsw and L are known. In a system as FIG. 1B, FIin=FI L: Equivalent transformer Leakage inductance $f_{sw}$: variable frequency [e.g. 50 . . . 250 kHz], as function of output power ($I_{dc} \cdot V_{lv}$).

$V_{lv}$: Low voltage;

n: equivalent primary to secondary transformer ratio (function of active secondaries). The effective transformer turn ratio which is a function of ratio Vhv/Vlv).

Control Example for a DCDC System With 3 Active Secondaries (Refer to FIG. 2A):

For the 3 secondaries, when $V_{hv}/V_{lv}$ ↑ ↑ (i.e., the ratio is high as with 450V/8V): $FI_1=FI_2=FI_3=FI$, then $n=3 \cdot n_p/n_s$, where $n_p$ is transformer winding turns at primary and $n_s$ is transformer winding turns at secondary. The 3 in this formula represents the number of active secondaries (all have same FI so all are contributing to power transfer) on the application FI is calculated according to formula 1. In this case, (Vhv/Vlv high) all the secondaries are having the same FI as calculated in formula 1. As seen in FIG. 2A, all three secondaries are in phase with a delay "FI" in respect to primary"

Control Example for a DCDC System With 1 Active Secondary (refer to FIG. 2B):

For 1 secondary when $V_{hv}/V_{lv}$ ↓ ↓ (i.e., the ratio is low as with 250V/16V): $FI_1=FI$, $FI_2=0$, FI=0.5, then $n=1 \cdot n_p/n_s$ where $n_p$ is transformer winding turns at primary, and $n_s$ is transformer winding turns at secondary, and the 1 in the formula is the number of active secondaries. In this case (Vhv/Vlv low) two secondaries (of the 3 in FIG. 2B) have FI fixed. The second secondary 24' has FI fixed to 0 (in phase with primary) and the third secondary 24" has FI fixed to 0.5 (in counter-phase with primary), leaving only first secondary 24 to operate at calculated FI. As secondaries 2, 24' and 3, 24" have opposite phase, primaries power transfer is cancelled and only first secondary is effectively working, regulated by FI calculated with explained n value. In this case ($V_{hv}/V_{lv}$ low) just one secondary is having FI as per formula 1. For the others, FI is fixed to 0 and 0.5, respectively While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A DC-DC converter that converts an input DC voltage to an output DC voltage, the DC-DC converter comprising:
a primary side switching network that receives the input DC voltage and outputs a primary side AC voltage;
a first transformer component including a first plurality of primary windings and a first plurality of secondary windings, the first transformer component receiving a first portion of the primary side AC voltage and outputting a first secondary side AC voltage;

a second transformer component including a second plurality of primary windings and a second plurality of secondary windings, the second transformer component receiving a second portion of the primary side AC voltage and outputting a second secondary side AC voltage, wherein the first plurality of primary windings is connected in series with the second plurality of primary windings;

a third transformer component including a third plurality of primary windings and a third plurality of secondary windings;

a first secondary side switching network that receives the first secondary side AC voltage; and a second secondary side switching network that receives the second secondary side AC voltage, wherein outputs from the first plurality of secondary windings and the second plurality of secondary windings are combined to form the output DC voltage, wherein when a ratio between the input DC voltage and the output DC voltage is below a predetermined threshold, counterphases in two of the first plurality of secondary windings, the second plurality of secondary windings and the third plurality of secondary windings are fixed to result in a functional cancellation.

2. The DC-DC converter of claim 1, wherein a first phase difference between the first plurality of secondary windings and the first plurality of primary windings, and a second phase difference between the second plurality of secondary windings and the second plurality of primary windings is adjusted to improve conversion efficiency.

3. The DC-DC converter of claim 2, wherein the first phase difference and second phase difference are adapted according to the ratio between the input DC voltage and the output DC voltage, such that the conversion efficiency is improved compared to a case in which the first phase difference and second phase difference are zero.

4. The DC-DC converter of claim 2, wherein the first phase difference and second phase difference are from 0 degrees to 180 degrees.

5. The DC-DC converter of claim 1, wherein the third transformer component receiving a third portion of the primary side AC voltage and outputting a third secondary side AC voltage, and wherein the third plurality of primary windings is connected in series with the first plurality of primary windings and the second plurality of primary windings.

6. The DC-DC converter of claim 5, wherein the first plurality of secondary windings, the second plurality of secondary windings, and the third plurality of secondary windings are set at the same phase difference with respect to the first plurality of primary windings, the second plurality of primary windings, and the third plurality of primary windings, respectively to produce conversion at a predetermined high, nominal input/output voltage ratio range.

7. The DC-DC converter of claim 1, wherein the input DC voltage is in a range between 230 to 650 volts.

8. The DC-DC converter of claim 1, wherein a primary side includes the primary side switching network, the first plurality of primary windings and the second plurality of primary windings.

9. The DC-DC converter of claim 8, wherein a secondary side includes the first plurality of secondary windings, the second plurality of secondary windings, the first secondary side switching network, and the second secondary side switching network.

10. The DC-DC converter of claim 1, wherein the primary side switching network includes a primary side H-bridge circuit.

11. The DC-DC converter of claim 10, wherein the first secondary side switching network includes a first secondary side H-bridge circuit.

12. The DC-DC converter of claim 11, wherein the second secondary side switching network includes a second secondary side H-bridge circuit.

13. The DC-DC converter of claim 1, further comprising a microcontroller configured to control the primary side switching network.

14. The DC-DC converter of claim 13, wherein the microcontroller is further configured to control the first secondary side switching network and the second secondary side switching network.

15. The DC-DC converter of claim 1, wherein the output DC voltage is less than the input DC voltage.

16. The DC-DC converter of claim 1, wherein the DC-DC converter is configured to be bidirectional.

17. The DC-DC converter of claim 1, wherein a first phase difference between the first plurality of secondary windings and the first plurality of primary windings, and a second phase difference between the second plurality of secondary windings and the second plurality of primary windings are adapted according to the ratio between the input DC voltage and the output DC voltage such that a conversion efficiency of the DC-DC converter is improved compared to a case in which the first phase difference and second phase difference are zero.

* * * * *